Aug. 26, 1924.   1,506,004
K. KOENIGSBERG
SIGNAL FOR AUTOMOBILES
Filed Jan. 26, 1923   2 Sheets-Sheet 1
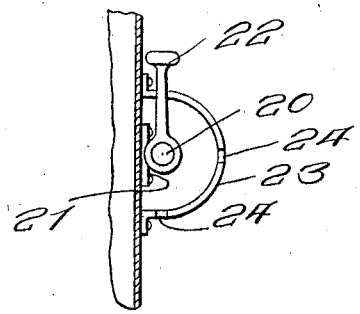
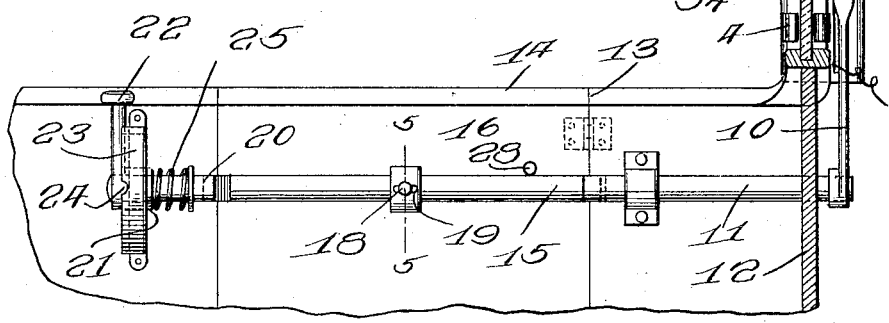
Inventor
Kurt Koenigsberg
By A. P. Torin
Attorney Aug. 26, 1924.
K. KOENIGSBERG
SIGNAL FOR AUTOMOBILES
Filed Jan. 26, 1923
1,506,004
2 Sheets-Sheet 2
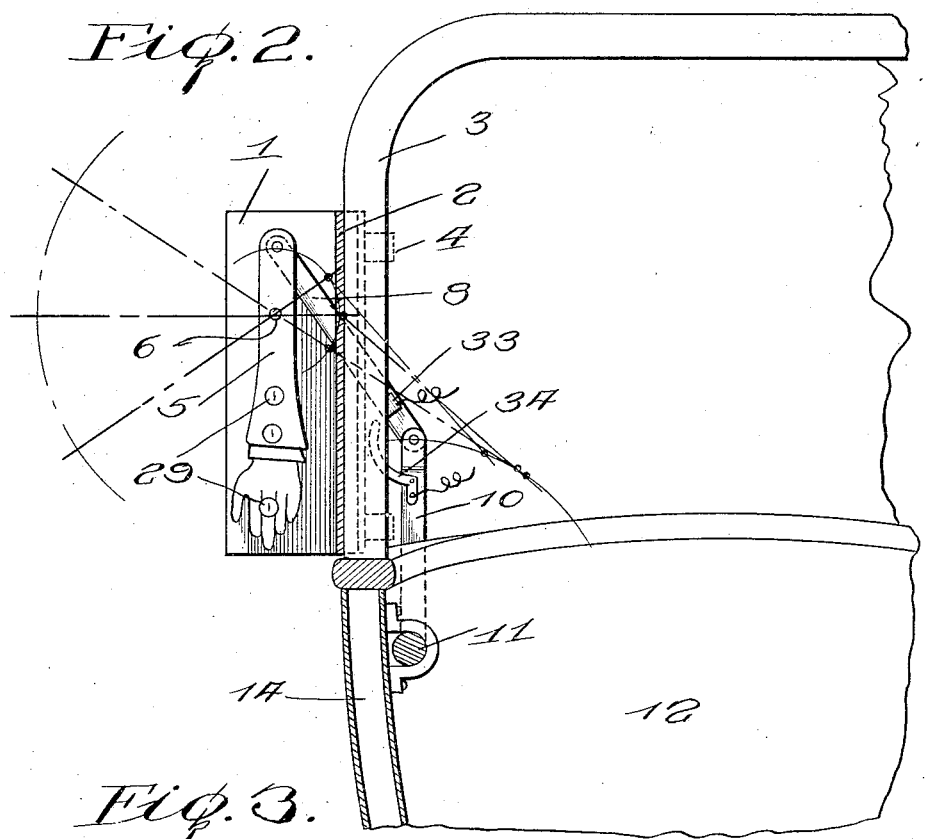
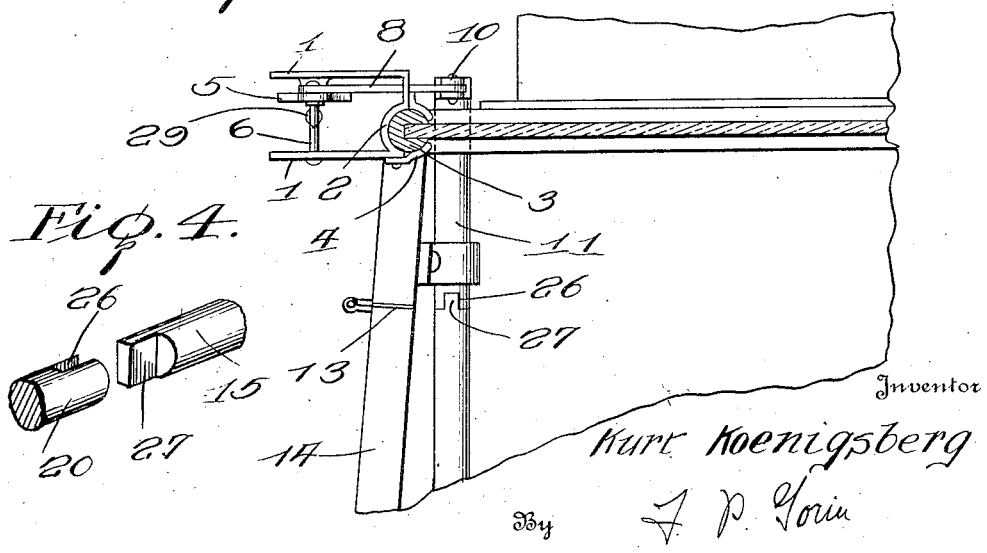
Inventor
Kurt Koenigsberg
By F. P. Sorin
Attorney Patented Aug. 26, 1924.

1,506,004

UNITED STATES PATENT OFFICE.

KURT KOENIGSBERG, OF SEATTLE, WASHINGTON.

SIGNAL FOR AUTOMOBILES.

Application filed January 26, 1923. Serial No. 615,084.

*To all whom it may concern:*

Be it known that KURT KOENIGSBERG, a citizen of the United States, residing at Seattle, in the county of King and State of Washington, has invented certain new and useful Improvements in Signals for Automobiles, of which the following is a specification.

This invention relates to an improvement in manually operable automobile signals, in the use of which the driver of a vehicle can indicate to pedestrians and drivers of other vehicles as to any contemplated action on his part.

The invention aims to provide a signal bar simulating a hand and arm adapted to be adjusted to various signal indicating positions by the driver, the means utilized by the driver for operating the signal being located convenient to his seat, and connected to the signal through an operating bar, which extends across the door opening leading to the driver's seat, and which in that part bridging said door opening is formed as an independent locking rod. This locking rod is capable of being manually adjusted into continuity with the operating bar, in which position the door is locked against casual opening, or such locking rod may be shifted to a position to permit usual opening and closing of the door.

The invention also contemplates the provision of illuminating means, through which the signal is readily visible at night, the circuit for such means being normally open and automatically closed, as the signal is moved to one or the other of its signal indicating positions.

The invention is illustrated in the accompanying drawings, in which:—

Figure 1 is a view in rear elevation showing a portion of a windshield and a part of the signal connected thereto;

Figure 2 is a side elevation of the signal and operating means, the adjacent parts of the vehicle being indicated in outline;

Figure 3 is an enlarged elevation showing the connection of the locking rod for the door in position to lock the door and form a continuation of the operating bar;

Figure 4 is a detail perspective showing the formation of the ends of the locking rod and operating bar to permit the connection of the locking rod in place;

Figure 5 is a section on line 5—5 of Figure 3.

Figure 6 is a perspective view of the switch.

Figure 7 is a diagram of the lighting circuit.

Figure 8 is an elevation of the handle holding means.

The invention comprises a shell-like casing 1 opening at the outer or front edge and at the top and bottom, the inner wall 2 of the casing being curved to fit more or less snugly one of the frame bars 3 of the windshield. The casing as a whole is removably secured to the windshield, as by clips 4, projecting from the casing. A signal arm 5, preferably simulating a hand and a portion of the forearm is mounted upon a pivot 6 bridging the side walls of the casing, so that the arm in one position is wholly concealed by the casing, and in other or signalling positions projects beyond the casing. The rear or inner wall of the casing is formed with a slot 7, offset from the plane of the windshield frame bar, to permit the necessary movement of the rear end of the signal arm. The signal arm is connected to a link 8, extending normally through the slot 7, which is connected in turn to a second link 9, with the latter connected to the up-turned end 10 of the operating bar 11. The main length of this bar extends lengthwise the side of the automobile, passing through and having a bearing in the dash 12, and crossing the door opening 13 adapted to be closed by the usual door 14.

That portion of the operating bar extending across the door opening is in the form of a separable section 15, hereinafter termed the locking rod. This locking rod is mounted in the eye 16 of a member rotatably mounted in the door, as at 17, a set screw 18 seating in a slot 19 in the locking rod to permit a swinging and limited longitudinal movement of such locking rod relative to the door. Beyond the locking rod the operating bar is extended as a section 20 supported in a bearing 21 and having an upturned or handle end 22. A notched segment 23, with the notches 24 thereof arranged to indicate the desired signalling position of the signal arm 5, is secured to the automobile structure, a spring 25 normally holding the handle end in any notch with which it may be engaged. The respective ends of the locking rod and the adjacent ends of the operating bar are formed, as for example with mortice and tenon constructions, as at 26, 27, whereby the locking rod may be conveniently connected as a section of the operating bar, or disconnected therefrom at will. A stop 28 may be arranged to limit the operative position of the locking rod when forming a part of the operating bar.

The signalling means includes electric bulbs or the like 29 for illuminating the signal for night use, and in the form of a signal arm described one of these lights may be positioned to indicate a ring on one of the fingers of the hands and the others to indicate buttons on the coat simulation. These lamps are so arranged as to show a white light in front of the signal and a red light from the rear of the signal. These lamps are included in the circuit 30 including a source of energy 31, a manually operable switch 32 and spaced contacts 33 and 34 arranged respectively on the adjacent ends of the links 8 and 9 so that in any operation of the operating bar to set the signal the contacts 33 and 34 will be brought into engagement and the circuit closed. The switch 32 provides for breaking the circuit during the day use of same.

From the above it will be apparent that the driver of a vehicle, through proper manipulation of the handle 22 may move the signal arm, in accordance with previously understood signals to indicate the further control of his automobile to any one interested in that control. During this operation the locking rod 15 effectively blocks the opening of the door either intentionally or casually. When it is desired to open the door the locking rod is swung on its pivot to disconnect it from the adjacent sections of the operating bar, and the door is thereafter controlled in the usual manner.

What is claimed as new is:—

1. The combination with an automobile, of a signal arm therefor, and an operating rod for actuating the signal arm, said rod including a movable section normally serving as a locking means for a door.

2. The combination with an automobile of a signal arm therefor, an operating bar for actuating the signal, said bar including a section supported for pivotal and sliding movement, and means on the ends of said section for interlocking with the adjacent sections of the operating bar.

3. A signal arm, an operating bar therefor, a link connection between said bar and arm, and a section of said bar mounted for swinging and sliding movement and adapted to be moved to form a continuation of the bar or to be wholly separated from the bar, the ends of the section being formed for interlocking connection with the adjacent ends of the bar.

4. A signal arm, an operating bar therefor, a door locking section included as a part of the operating bar, said section being movable to and from bar connecting position, a handle section for actuating the operating bar, and means for holding the handle section in adjusted position.

5. The combination with an automobile, of a signal arm mounted thereon, an operating bar including a movable section crossing the door opening of the automobile, said section being movable to a position to interrupt the operating bar and permit opening of the door, and link connections between the operating bar and signal arm.

6. A signal including a casing removably secured to the windshield of an automobile, the casing being formed in its rear edge with a slot offset from the windshield, a signal arm pivotally supported in the casing, a link connected to said arm and projecting through the slot, a second link connected to said first mentioned link, and an operating bar connected to the second link, said bar terminating in a handle portion convenient to the driver's seat.

In testimony whereof I affix my signature.

KURT KOENIGSBERG.